United States Patent [19]
Fukatsu

[11] Patent Number: 5,951,085
[45] Date of Patent: *Sep. 14, 1999

[54] EQUIPMENT IN LUGGAGE COMPARTMENT FOR AUTOMOTIVE VEHICLE

[75] Inventor: Yoshimi Fukatsu, Kanagawa-ken, Japan

[73] Assignee: Nissan Motor Co., Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/720,300

[22] Filed: Sep. 27, 1996

[30] Foreign Application Priority Data

Sep. 27, 1995 [JP] Japan .................................... 7-249544

[51] Int. Cl.⁶ ...................................................... B60R 7/02
[52] U.S. Cl. ............................................................ 296/37.8
[58] Field of Search ................................ 296/37.1, 37.2, 296/37.8

[56] References Cited

U.S. PATENT DOCUMENTS

| | | | |
|---|---|---|---|
| 2,488,481 | 11/1949 | Stephenson et al. | 296/37.2 |
| 4,752,096 | 6/1988 | Ishikawa | 296/37.16 |

FOREIGN PATENT DOCUMENTS

| | | | |
|---|---|---|---|
| 652 249 | 3/1929 | France | 296/37.1 |
| 54-173446 | 12/1979 | Japan . | |
| 58-139351 | 9/1983 | Japan . | |
| 60-156047 | 10/1985 | Japan . | |
| 62-74018 | 5/1987 | Japan . | |
| 2-76547 | 6/1990 | Japan . | |

*Primary Examiner*—Dennis H. Pedder
*Attorney, Agent, or Firm*—Foley & Lardner

[57] ABSTRACT

An equipment in a luggage compartment for an automotive vehicle, include a luggage finisher arranged inside of a luggage inner panel of a vehicular body which is formed by a luggage outer panel and the luggage inner panel. The luggage finisher has a first box which passes through an opening of the luggage inner panel to be received in a space between the luggage outer panel and the luggage inner panel. The first box having an inside wall which is arranged at a location neighboring the luggage outer panel. The equipment also includes a lid for opening and closing an opening of the first box, and a first vent hole formed in the lid and a second vent hole formed in the inside wall of the first box. Each of the first and second vent holes comprises a plurality of slits for allowing air in a luggage compartment to be discharged to the space between the luggage outer panel and the luggage inner panel. The equipment may further include a second box which is supported on a bottom portion of the first box of the luggage finisher and which is received in a space below the first box, the second box having a lid which serves as the bottom portion of the first box when the lid of the second box is closed.

12 Claims, 5 Drawing Sheets

EQUIPMENT IN LUGGAGE COMPARTMENT FOR AUTOMOTIVE VEHICLE

BACKGROUND OF THE INVENTION

1. Field of The Invention

The present invention relates to an equipment in a luggage compartment for an automotive vehicle.

2. Description of The Prior Art

An equipment in a luggage compartment for an automotive vehicle is disclosed in, for example, Japanese Utility Model Laid-Open No. 54-173446. In this equipment, a trim panel (or a luggage finisher) for lining an inner panel (or a luggage inner panel) of a vehicular body, is integrally formed with a recessed portion (or a box) for receiving articles therein, and the box is received in an opening formed in the (luggage) inner panel. In addition, a lid is integrally formed with a mounting portion and a body portion via a self hinge portion. The mounting portion forms a supporting wall which covers the bottom portion of the recessed portion for receiving articles therein and on which the received articles are supported. The mounting portion is secured to the portion surrounding the recessed portion by means of a mounting bracket, and the body portion is folded at the self hinge portion so as to cover the mounting bracket.

Another equipment in a luggage compartment for an automotive vehicle-is disclosed in Japanese Utility Model Laid-Open No. 58-139351. In this equipment, a small-article receiving box with a lid is provided in a space defined by the side portion of a floor panel of a trunk room and a rear-fender panel (or a luggage outer panel), so as to be arranged at a location higher than the plane of the floor panel. A side wall projecting from the floor panel in a vehicular cabin has a cut-out or notch. This cut-out or notch is associated with the lid for forming an opening for receiving and holding one end of a long article such as a golf club.

Japanese Utility Model Laid-Open No. 2-76547 discloses a small-article receiving box for an automotive vehicle, which is provided on a trim in a vehicular cabin, the trim having a formed portion protruding toward the interior of the vehicular cabin. This small-article receiving box is provided below the formed portion. The small-article receiving box has an opening at the top thereof. Above the opening, a lid having a lower edge pivotably supported on the outer edge of the opening is provided. The lid has engaging means for locking the lid at any one of a first engaging position at which the upper edge of the lid engages the inside lower portion of the formed portion so that the surface of the lid extends along the curved surface of the formed portion, and a second engaging position at which the upper edge of the lid engages the outside lower portion of the formed portion so as to open the opening of the small-article receiving box.

Japanese Utility Model Laid-Open No. 62-74018 discloses another equipment in a luggage compartment for an automotive vehicle. In this equipment, a storage space (or a box) Is provided in a space between a luggage inner panel and a luggage outer panel of a vehicular body. This space between the luggage inner panel and the luggage outer panel serves as a duct for discharging air in a vehicular cabin. A part of a cover (or a lid) for covering an opening formed in the luggage inner panel so as to allow articles to be taken in and out of the storage space (the box) is formed with a vent hole for discharging air In the vehicular cabin to the outside.

Japanese Utility Model Laid-Open No. 80-156047 discloses another equipment in a luggage compartment for an automotive vehicle. In this equipment, a trim board is mounted on an inner panel on the side portion of a vehicular cabin, and a storage box for receiving small articles therein is provided on the side portion of the vehicular cabin. The front plate of the storage box has an opening for receiving small articles therein. The storage box has a roof plate, a bottom plate and right and left side plates which project from the front plate toward the trim board so as to surround the opening. The lower edge of the roof plate is arranged above the lower edge of the opening.

However, according to the aforementioned equipment disclosed in Japanese Utility Model Laid-Open No. 54-173446, it is not assumed to increase the size of the recessed portion, and there is an useless space (or a dead space) around the recessed portion.

According to the equipment disclosed in Japanese Utility Model Laid-Open No. 58-139351, since the body of the small-article receiving box protrudes from the floor panel of the trunk room, there is an useless space (or a dead space) similar to the aforementioned Japanese Utility Model Laid-Open No. 54-173448, and it is not possible to hold the lid at its open position.

In addition, according to the equipment disclosed in Japanese Utility Model Laid-Open No. 2-76547, there is an useless space (or a dead space) at the lower edge portion of the formed portion similar to the aforementioned Japanese Utility Model Laid-Open No. 54-173446.

Moreover, according to the equipment disclosed in Japanese Utility Model Laid-Open No. 74018, since the inner surface of the luggage outer panel of the vehicular body is exposed via the opening when the cover is open, the color of the vehicular body is visible, so that it is desired to improve the appearance.

SUMMARY OF THE INVENTION

It is therefore an object of the present Invention to provide an equipment In a luggage compartment for an automotive vehicle, which can decrease an useless space (an dead space), hold an open lid in position, and improve the appearance.

In order to accomplish the aforementioned and other objects, according to one aspect of the present invention, an equipment in a luggage compartment for an automotive vehicle, comprises: a luggage finisher arranged inside of a luggage inner panel of a vehicular body which is formed by a luggage outer panel and the luggage inner panel, the luggage finisher having a first box which passes through an opening of the luggage inner panel to be received in a space between the luggage outer panel and the luggage inner panel, the first box having an inside wall which is arranged at a location neighboring the luggage outer panel; a lid for opening and closing an opening of the first box; and a first vent hole formed in the lid and a second vent hole formed in the inside wall of the first box, each of the first and second vent holes comprising a plurality of slits for allowing air in a luggage compartment to be discharged to the space between the luggage outer panel and the luggage inner panel.

According to this equipment, the air in the luggage compartment can be discharged, via the slit-like vent holes, to the space between the luggage inner panel and the luggage outer panel, so as to ensure the flow of the air. In addition, since the vent holes comprise a plurality of slits, the coating on the inner surface of the luggage outer panel is invisible if the passenger in the vehicular cabin or the luggage compartment looks in at the vent hole, so that it is possible to improve the appearance.

The equipment may further comprise a second box which is supported on a bottom portion of the first box of the luggage finisher and which is received in a space below the first box, the second box having a lid which serves as the bottom portion of the first box when the lid of the second box is closed. In this case, the dead space below the first box can be used as the second box, so that it is possible to increase the storage space. In addition, since the lid of the second box serves as the bottom portion of the first box, articles can be received in both of the first and second boxes when the lid of the second box is closed.

The lid of the second box way have an engaging portion which is engageable with the inside wall of the first box when the lid of the second box is open. In this case, when the lid of the second box is open so as to engage the Inside wall of the first box, a relatively long article can be received In a wider space defined by the first and second boxes.

The bottom portion of the first box of the luggage finisher may have an opening for detachably receiving the second box. In this case, the articles can be easily taken out of the second box.

Each of the vent holes may have a plurality of inclined fins which are parallel to the plane of the opening formed in the bottom portion of the first box for receiving the second box. In this case, when the luggage finisher is molded, the vent hole and the opening for receiving the second box can be simultaneously molded by the movement of the moving mold, so that it Is possible to decrease the number of processes.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to this specific embodiment, but are for explanation and understanding only.

In the drawings.

DESCRIPTION OF THE PREFERRED EMBODIMENT

Figure 1:
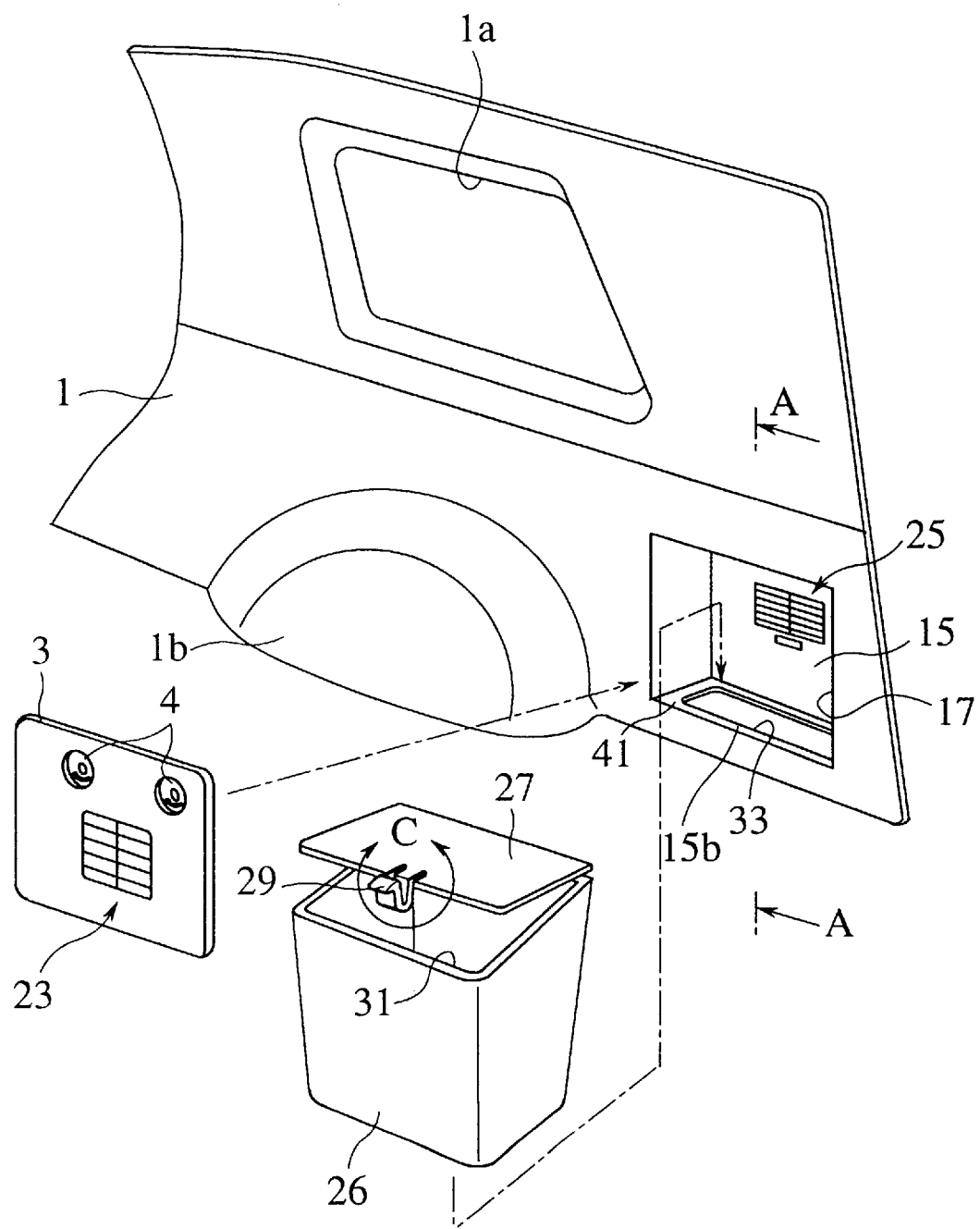
FIG. 1 is an exploded perspective view of the preferred embodiment of an equipment in a luggage compartment for an automotive vehicle, according to the present invention.

Referring now to the drawings, particularly to FIGS. 1 through 6, the preferred embodiment of an equipment in a luggage compartment for an automotive vehicle, according to the present invention, will be described below.

An equipment in a luggage compartment for an automotive vehicle, according to the present invention, comprises at least a luggage finisher 1 and a lid 3.

Figure 2:
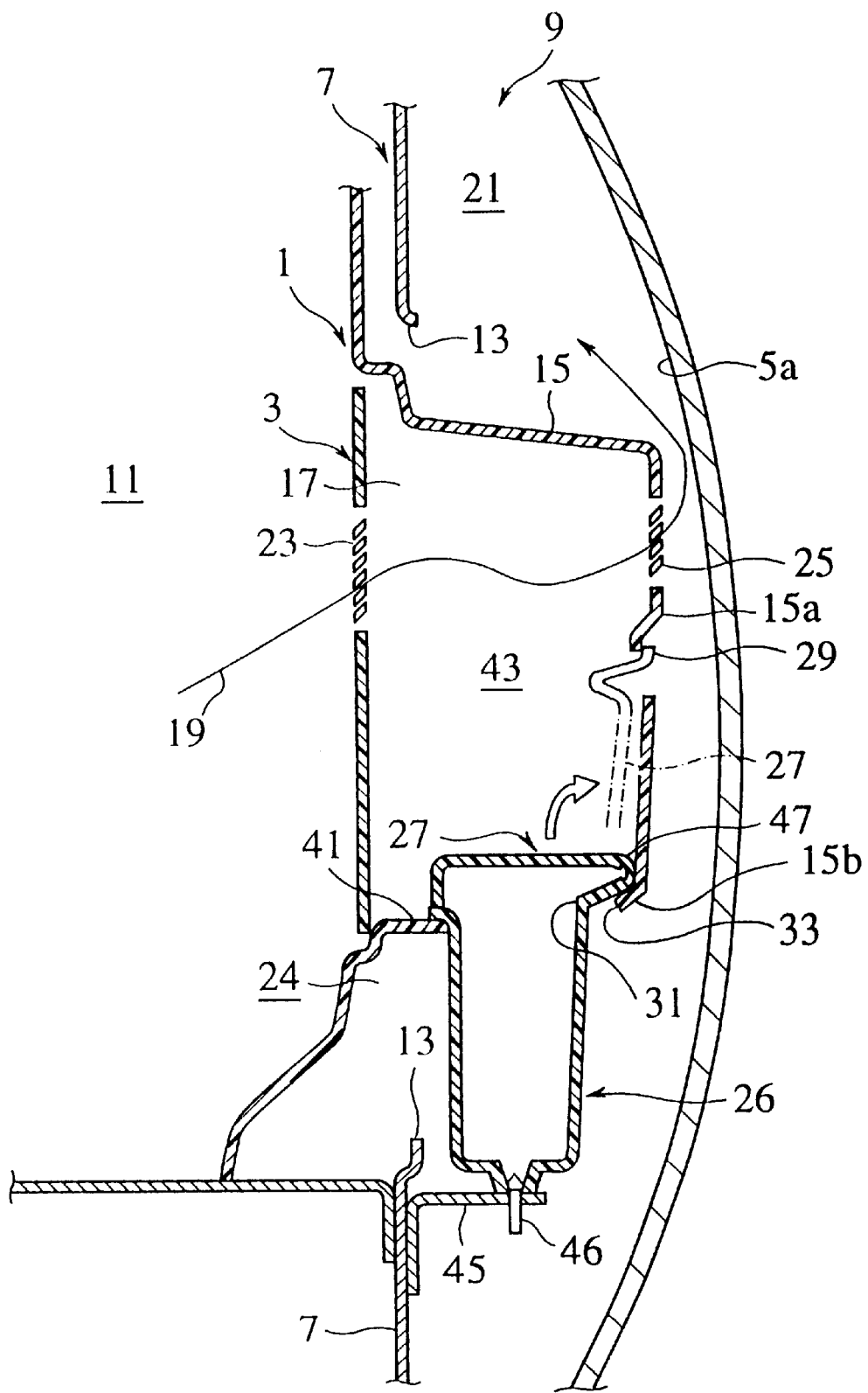
FIG. 2 Is a sectional view of the equipment taken along line A—A of FIG. 1.

The luggage finisher 1 is made of a synthetic resin plate. As shown in FIG. 2, the luggage finisher 1 is arranged on the side of a luggage compartment 11 by means of a luggage inner panel 7 of a vehicular body 9 which comprises a luggage outer panel 5 and the luggage inner panel 7. As shown in FIG. 1, the luggage finisher 1 has a window 1a for covering the periphery of a side window panel (not shown), and a protruding portion 1b for covering a tire housing inner panel (not shown).

In addition, the luggage finisher 1 is formed with a first box 15 which has an inside wall 15a at a location neighboring an inner surface 5a of the luggage outer panel so that the first box 15 passes through an opening 13 of the luggage inner panel 7.

The lid 3 is so arranged as to cover an opening 17 of the first box 15 of the luggage finisher 1. The lid 3 is so mounted as to open and close the opening 17 of the first box 15. In addition, the lid 3 has locking members 4.

The lid 3 Is formed with a vent hole 23 having a plurality of slits for allowing an air 19 in the luggage compartment 11 to pass through the vent hole 23. Similarly, the inner wall 15a of the first box 15 of the luggage finisher 1 is formed with a vent hole 25 having a plurality of slits for allowing the air 19 to pass through the vent hole 25.

Figure 3:
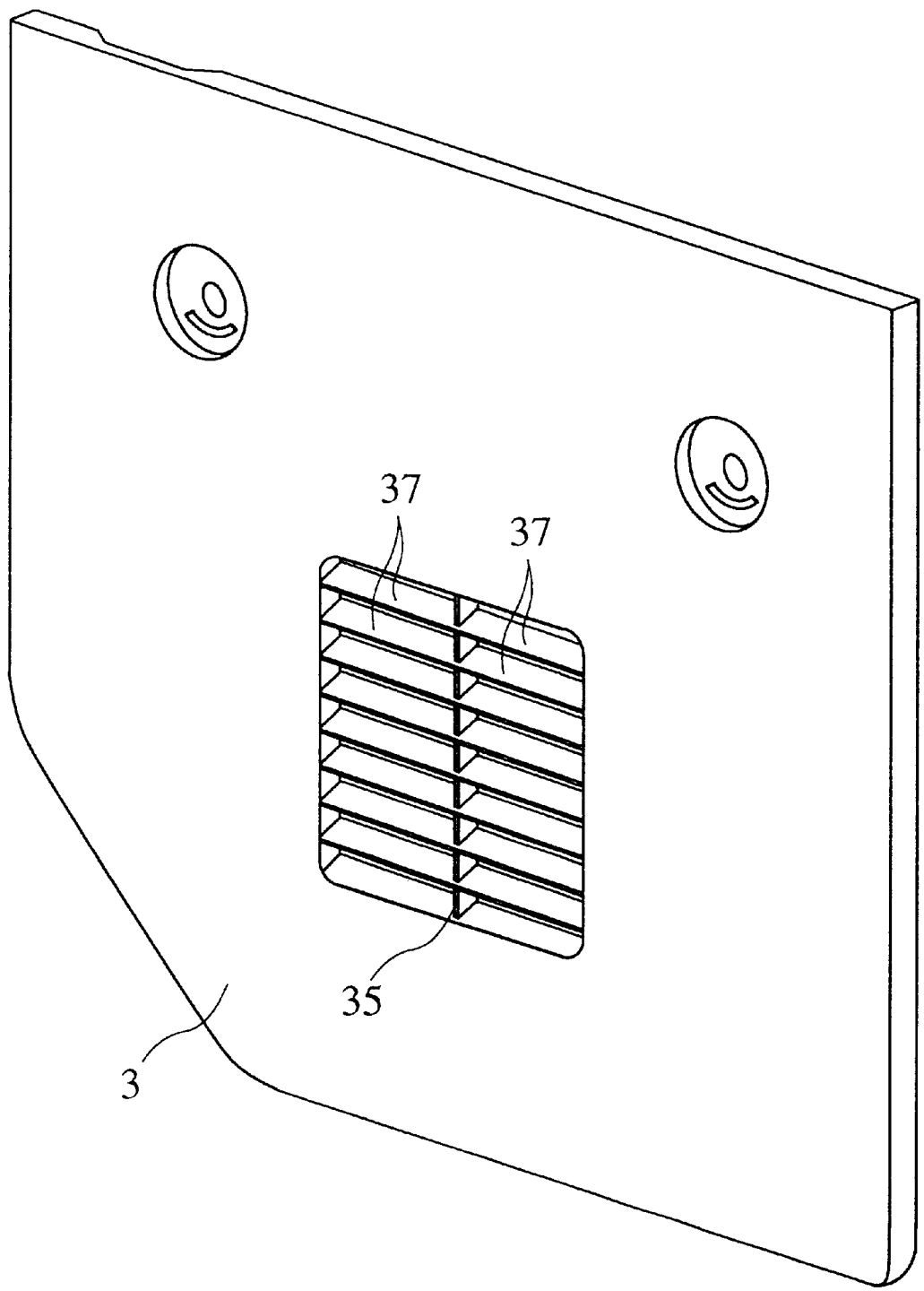
FIG. 3 is a perspective view of a lid of the equipment of FIG. 1.

As can be clearly seen from FIG. 3, the vent hole 23 of the lid 3 has a rib 35 extending upwards and downwards at the center of the vent hole 23, and a plurality of fins 37 on both sides of the rib 35. Each of the fins 37 has a width of 50 mm. As can be clearly seen from FIGS. 4 and 5, the fins 37 are located at intervals of 12 mm in the upward and downward directions. The vent hole 25 of the inner wall 15a of the first box 15 of the luggage finisher 1 has the same structure as that of the vent hole 23 of the lid 3.

Each of the fins 37 is inclined by a predetermined angle θ, e.g. 30 degrees, with respect to the horizontal plane 39. With respect to each of the fins 37, the height H of the portion nearest the luggage compartment 11 is 1.5 mm, the thickness M of the portion nearest the luggage compartment 11 is 1.5 mm, the whole length N is 7 mm, and the board thickness is 1.5 mm.

The air passing through the vent holes 23 and 25 are discharged to the outside via a space 21 between the luggage outer panel 5 and the luggage inner panel 7.

A second box 26 is supported on the bottom portion 15b of the first box 15 of the luggage finisher 1 so as to be housed in a space 24 below the bottom portion 15b of the first box 15. The second box 26 has a lid 27 which serves as the bottom portion of the first box 15. An extension panel 45 projects into a space between the inner panel 7 and the outer panel 5 from the luggage inner panel 7. The extension panel 45 has a retainer 46 installed thereon for engagement with the second box 26.

The lid 27 of the second box 26 can be open and closed by means of a thin-walled hinge 47. The lid 27 has a locking member 29 for holding the second box 26 In its closed position.

Figure 4:
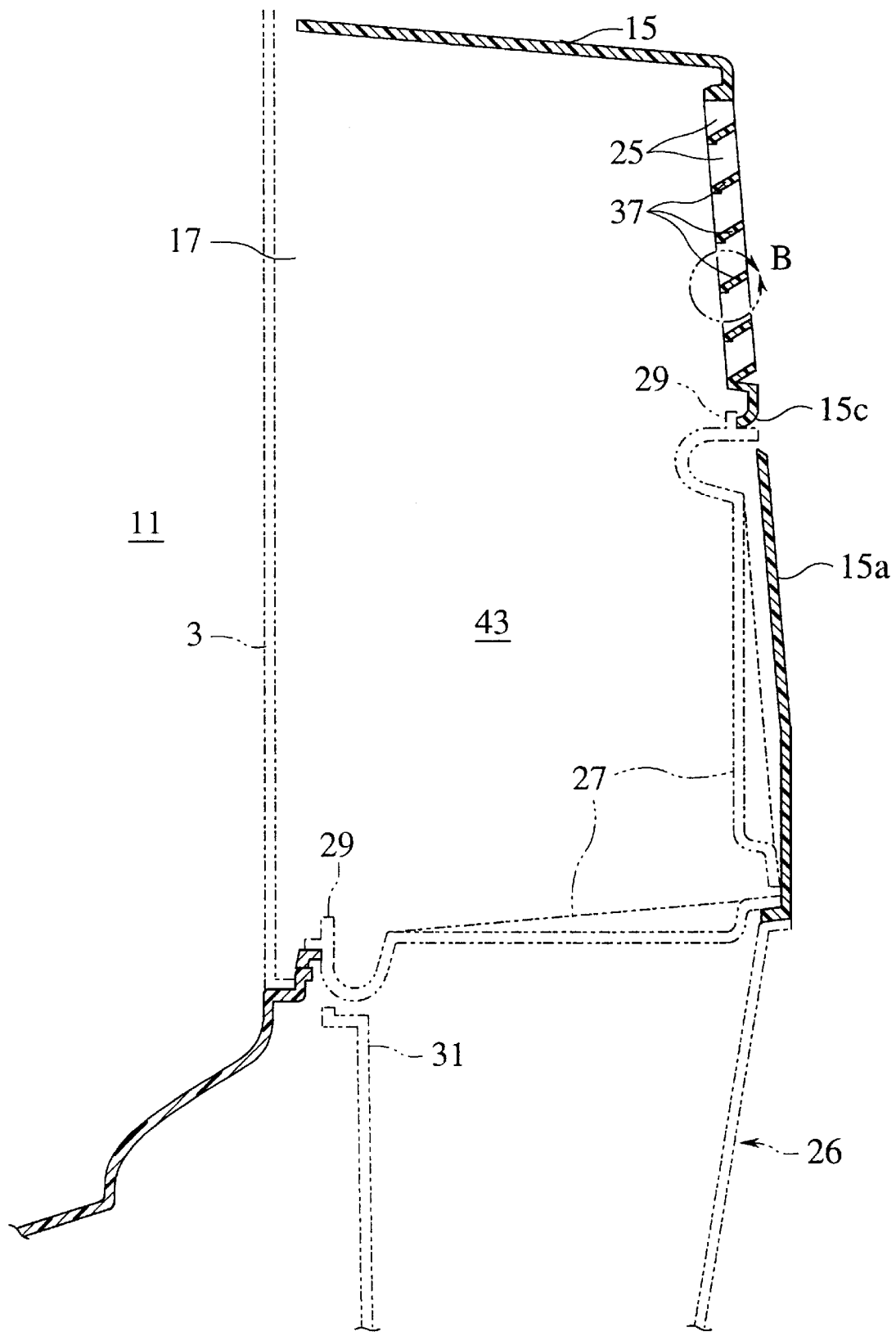
FIG. 4 is an enlarged sectional view of a main portion of the equipment of FIG. 2.
Figure 5:
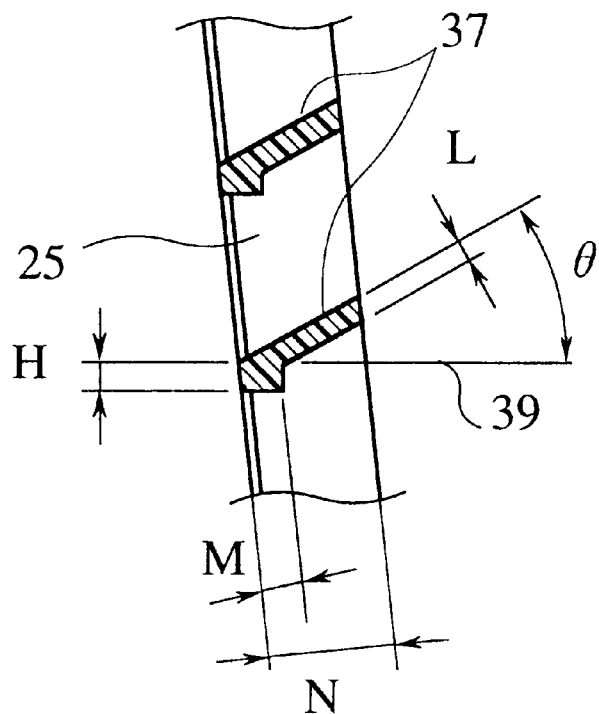
FIG. 5 is an enlarged sectional view of portion B of FIG. 4.
Figure 6:
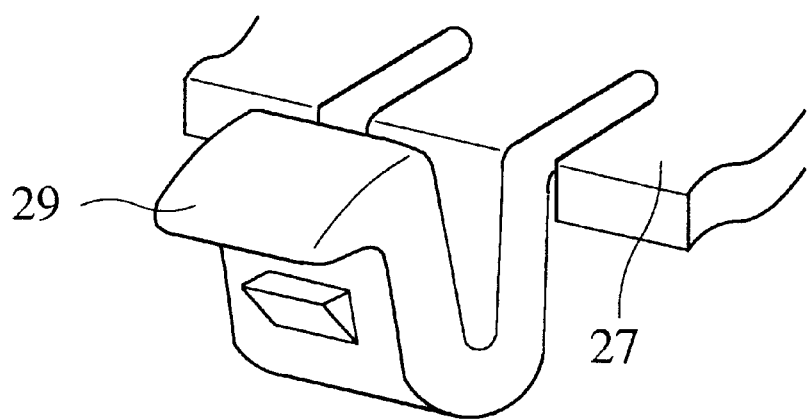
FIG. 6 is an enlarged perspective view of portion C of FIG. 1.

As can be clearly seen from FIG. 4, when the lid 27 of the second box 26 is fully open, the locking member 29 is designed to engage an engaging portion 15c of the inside wall 15a of the first box 15.

Furthermore, as shown in FIGS. 1 and 2, the bottom portion 15b of the first box 15 of the luggage finisher 1 has an opening 33 for detachably receiving the second box 26.

The extending direction of the vent hole 25 of the first box 15 is the same as the extending direction of the plane 41 having the opening 33 formed in the bottom portion 15b of the first box 15 for receiving the second box 26, so as to have the same moving direction of a moving mold (not shown) for the luggage finisher 1. That is, the directions of the fins of the vent hole 25 are the same as that of the plane 41.

As mentioned above, according to the present invention, the air 19 in the luggage compartment 11 can be discharged, via the slit-like vent holes 23 and 25, to the space 21 between the luggage inner panel 7 and the luggage outer panel 5, so as to ensure the flow of the air 19. In addition, since each of the vent holes 23 and 25 comprises a plurality of slits, the coating on the inner surface 5a of the luggage outer panel 5 is invisible if the passenger in the luggage compartment 11 looks in at the vent hole 23, so that it is possible to improve the appearance.

In addition, since the dead space below the first box 15 can be efficiently used as the second box 26, it is possible to increase the storage space.

Since the lid 27 of the second box 28 serves as the bottom portion of the first box 15, articles can be received in either of the first box 15 or the second box 26 when the lid 27 of the second box 26 is closed.

When the lid 27 of the second box 26 is open so as to engage the inside wall 15a of the first box 15, if the lower portion of the long article is inserted into the opening 31 of the second box 28, relatively long articles can be received in a wider space defined by the first box 15 and the second box 26.

In addition, it is possible to insert or extract the long article through the opening 33 formed in the bottom portion 15a of the first box 15 into or out of the space 24 as a deadspace under the first box 15. If the lower portion of the long article is inserted into the opening 33, relatively long articles can be received in a wider space defined by the first box 15 and the second box 26.

In addition, when the luggage finisher 1 is molded, the vent hole 25 and the opening 33 for receiving the second box 26 can be simultaneously molded by the movement of the moving mold, so that it is possible to decrease the number or processes.

What is claimed is:

1. A storage equipment for a luggage compartment in an automotive vehicle, comprising:

a luggage inner panel having a first opening;

a luggage outer panel spaced outwardly from said luggage inner panel;

a luggage finisher adapted to form a part of the luggage compartment and disposed on a surface of said luggage inner panel;

said luggage finisher forming a first box received in the first opening, said first box extending between the luggage inner and outer panels and having a vertical wall and a bottom wall;

a first lid mountable on said luggage finisher to selectively close said first box, thereby, when closed, providing a first storage separated from the luggage compartment by said first lid, said first lid having a first vent hole;

said inner vertical wall having a second vent hole communicable with the first vent hole to vent air inside the luggage compartment; said bottom wall of the first box having a second opening; and a second box disposed within the first box and having an upper opening and being detachably supported by said bottom wall, said second box extending below the bottom wall to provide an expanding storage space extending between the first and second box, and said second box extending substantially above a bottom of the luggage compartment.

2. A storage equipment as set forth in claim 1, further comprising a second lid having a hinge connected to a top portion of the second box to selectively open and close said upper opening thereby defining, when closed a separate storage from the first storage, said second lid comprising a lock member for engagement with an engaging portion provided in the inner vertical wall to hold said second lid in an opening position.

3. A storage equipment as set forth in claim 2, wherein said second box provides, when said second lid is held open, a space therein for receiving an elongated article extending between said first and second boxes while providing a supporting bottom for an article to be housed within the first box when said second lid is closed.

4. A storage equipment as set forth in claim 3, wherein said engaging portion is positioned below the second vent hole so that the air ventilation through the first and second vent holes are not prevented.

5. A storage equipment as set forth in claim 3, wherein said second lid is, when held secured in the open position, vertically oriented and provides a substantially planer surface cooperatively with inside wall of the second box in order to permit unobstructed loading and unloading of the elongated article.

6. A storage equipment as set forth in claim 3, wherein said luggage finisher is formed by a synthetic resin and said bottom wall comprises a generally planer surface.

7. A storage equipment as set forth in claim 6, wherein said inner vertical wall has a plurality of second vent holes separated from each other by a fin.

8. A storage equipment for an automotive vehicle having a luggage compartment, comprising:

an inner finisher defining a part of the luggage compartment;

a first box provided in the inner finisher, the first box having a vertical wall and a bottom wall, thereby providing a first storage space, wherein the bottom wall has an opening;

a lid for releasability affixing to open and close the first box; thereby providing said first storage space separated from the luggage compartment;

a first air vent in the lid to provide communication between the luggage compartment and the inside of the first box;

a second air vent formed in the vertical wall; and a second box with a flange extending around the top periphery thereof, said second box being supported within the opening, and said second box extending substantially above a bottom of the luggage compartment.

9. A storage equipment for a luggage compartment of an automotive vehicle, the automotive vehicle having within a space between an inner panel and an outer panel, both generally extending vertically and spaced laterally to each other, the storage equipment comprising:

a luggage finisher mounted on the inner panel defines a part of the luggage compartment and forms a first box projecting through an opening of the inner panel into said space, wherein said first box includes a side wall extending generally vertically and outwardly of the inner panel and a bottom wall extending laterally and joining with the side wall, the first box having an opening facing the interior of the luggage compartment;

a first lid detachable to the luggage finisher for opening and closing the opening of said first box, thereby providing a first storage separable from the luggage compartment;

a first vent formed in said first lid and a second vent formed in said inside wall for allowing air in the luggage compartment to be discharged to the space between the inner and outer panels;

a second box exposed within the first box having an opening portion facing the interior of the first box and extending below the bottom wall of the first box;

a second lid connected to a top of the second box through a hinge and selectively opening and closing the opening portion of the second box, thereby providing a second storage separable from the first box and luggage compartment;

a lock member integral with the second lid;

a first engaging portion provided on the luggage finisher and engageable with the lock member for securing the second lid when the second lid is closed;

a second engaging portion provided on the side wall and positioned below the second vent engageable with the lock member for securing the second lid when the second lid is held open while ensuring the discharge of the air of the luggage compartment; and an extension panel projecting from the luggage inner panel, said extension panel having a retainer installed thereon for engagement with the second box.

10. A storage equipment as claimed in claim 9, said lock member comprising a resilient U-shape portion at a free edge thereof with a projecting portion outwardly extending from the U-shape portion, said projecting portion being selectively engageable with the first and second engaging portions.

11. A storage equipment as claimed in claim 10, said second lid is held in a substantially upright position when secured open for receiving an elongated article extending between said first and second boxes.

12. A storage equipment as claimed in claim 11, wherein said hinge of the second lid is provided on the outer side top of the second box.

\* \* \* \* \*